United States Patent

[11] 3,578,094

[72] Inventors Nelson R. Henry;
Donald R. Middour, Decatur, Ga.
[21] Appl. No. 759,567
[22] Filed Sept. 13, 1968
[45] Patented May 11, 1971
[73] Assignee The Woodman Company, Inc.
Decatur, Ga.

[54] FEEDING SYSTEM FOR CONSTANT PRODUCT FLOW
4 Claims, 5 Drawing Figs.

[52] U.S. Cl. .................................................. 177/108,
177/119, 198/30, 198/37, 198/39, 222/55
[51] Int. Cl. ........................................................ G01g 13/16
[50] Field of Search .................................................. 177/67, 71,
82, 108, 115, 119—121, 168—170; 198/37, 30, 39
(Inquired); 222/55 (Inquired)

[56] References Cited
UNITED STATES PATENTS

| 474,777 | 5/1892 | Keith | 177/115 |
|---|---|---|---|
| 2,675,120 | 4/1954 | Autenrieth et al. | 177/119X |
| 2,701,703 | 2/1955 | Evers | 177/121 |
| 2,812,151 | 11/1957 | Mosher | 177/108 |
| 2,904,304 | 9/1959 | Zwoyer et al. | 177/108 |
| RE26,221 | 6/1967 | Soojian | 177/120 |
| 3,373,830 | 3/1968 | Thomson | 177/168 |
| 2,266,906 | 12/1941 | Rapp | 198/37 |

FOREIGN PATENTS

| 1,132,465 | 3/1957 | France | 177/119 |

Primary Examiner—Richard B. Wilkinson
Assistant Examiner—George H. Miller, Jr.
Attorney—Lowe and King ABSTRACT: A feeding system including a plurality of in-line vibratory conveyors in which bulk feed is transformed into uniform single-file or column feed whereby product in flight from the system at any given time is equal. A hopper conveyor transfers multiple layers of product to a primary vibratory feeder in response to the demand as gauged by the total weight of the product in said feeder. The primary feeder subcombination employs horizontal section and a contiguous inclined section with a feeding step in between to form a wedge-shaped body of product for regulation of product flow and for thinning out of the product to a single layer with multiple rows. The product then enters a secondary vibratory feeder having its vibrator unit attached at an acute angle to the longitudinal axis of the feeder pan whereby the multirow flow is converted into the single-file flow against a side guide wall of the feeder pan.

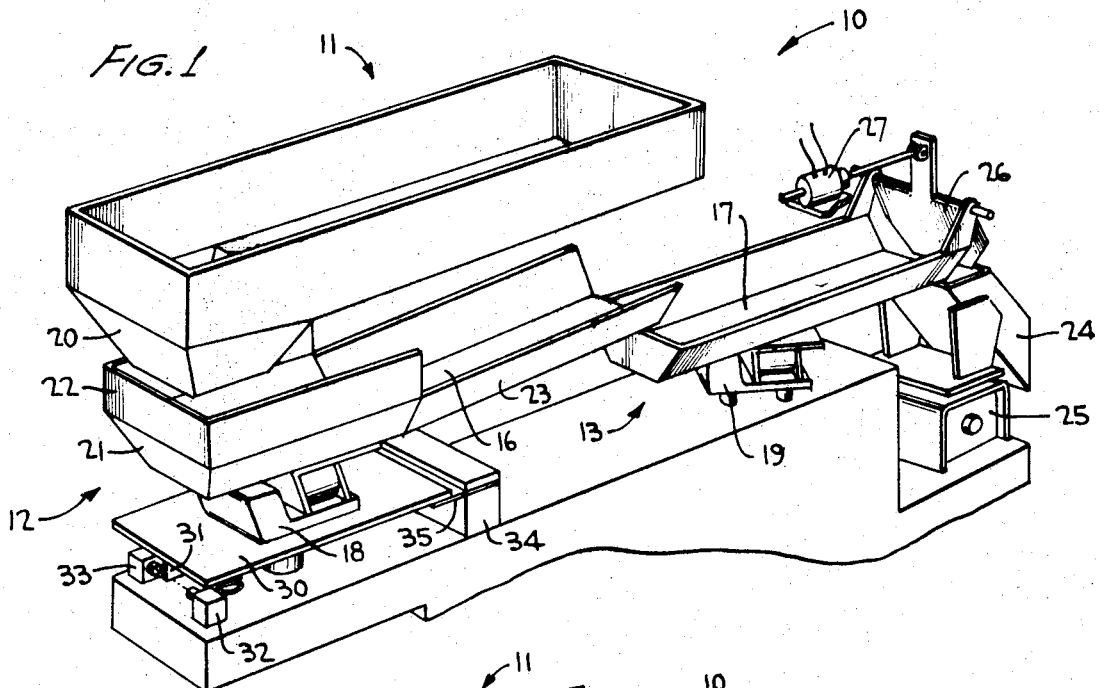
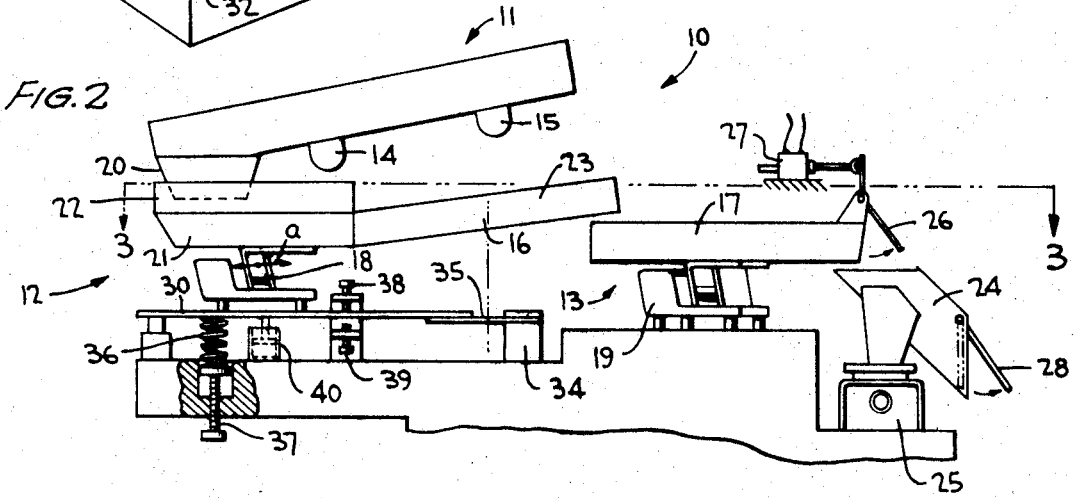

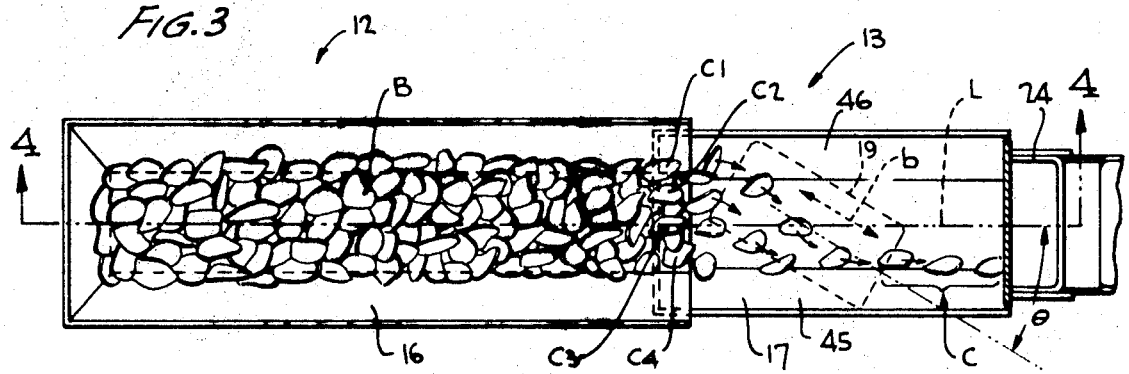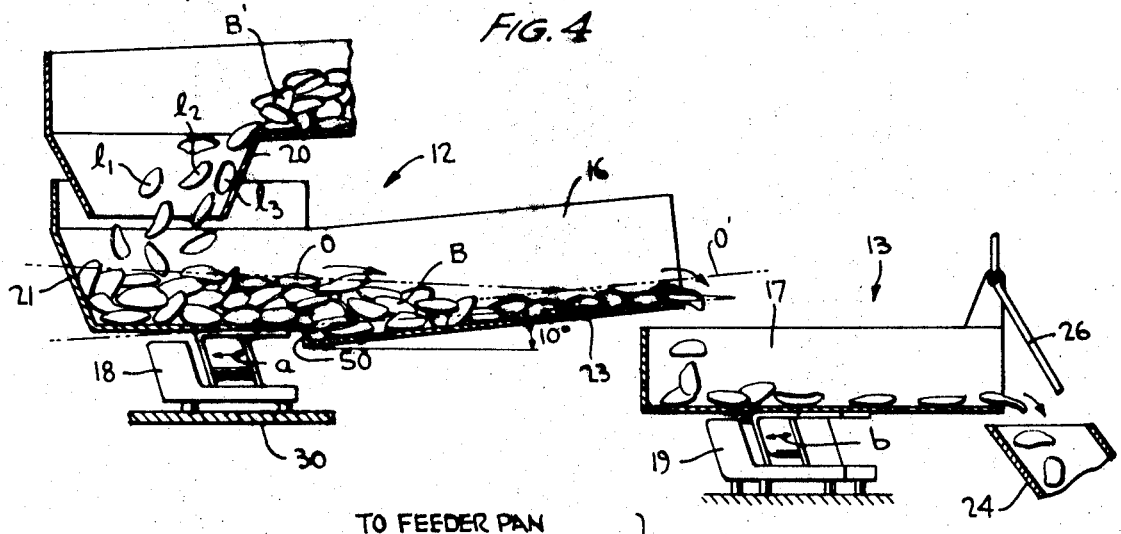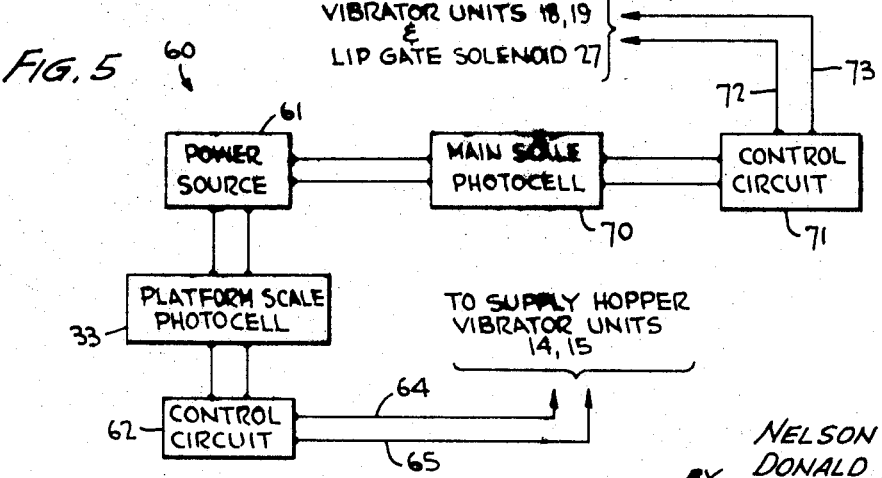

FEEDING SYSTEM FOR CONSTANT PRODUCT FLOW

The present invention relates to an improved feeding system for product and, more particularly, to a combination conveyor system capable of efficiently transforming loose product, such as potato chips, from bulk flow into uniform product flow.

In the form and fill packaging operation it is necessary to provide a rapid, yet uniform and constant flow of product to the weighing hopper to permit an efficient weighing operation of the batches of product. Performing accurate weighing operations in rapid succession requires that the product be effectively thinned out in each form and fill machine from the bulk flow which is received from the common transfer conveyor to a flow in a uniform stream whereby the product in flight to the weighing hopper is the same at any given time. That is, in order to rapidly weigh batches of product to obtain maximum speed of the machine, a weighing cycle must be adopted wherein the firing point of the scale for the batch is actually reached before all of the product has come to rest in the weighing hopper. If the stream of product entering the weighing hopper is a uniform stream, then the product in flight at the instant each batch is completed is equal and the total weight of each successive batch will be the same thereby insuring that bags of uniform weight are formed by the packaging machine.

To explain further, in the absence of constant product flow into the weighing hopper, the weight of the bags becomes erratic. For example, overweight bags are formed if a lump of product is fed into the scale hopper after the firing point of the scale is reached. On the other hand, if a lump of product is introduced into the weighing hopper just prior to the firing point, an underweight batch may result due to the overtravel of the scale resulting from the increased momentum of the falling product. Furthermore, the efficiency of operation of the machine is severely limited in other ways as a result of erratic operation, such as faulty registration, product trapped in the seal area, and dry cycles due to the incomplete filling of the weighing hopper during the predetermined cycle time.

Heretofore, the conventional feeding system for the product in a form and fill machine consisted of three inline vibratory conveyors including a supply conveyor or hopper for receiving the product from the common transfer conveyor, a primary feeder for receipt of a layer of product from said supply conveyor, and a secondary feeder for receiving the product from said primary feeder and feeding the same in a controlled manner to the weighing hopper, as shown for example in U.S. Pat. No. 2,071,443 to Weckerly, issued Feb. 23, 1937. Subsequent improvements on this basic combination have included the use of a pivotal spade at the outlet of the supply hopper to sense the layer of product being fed to the primary conveyor and to control the supply conveyor in accordance with the demand. While this arrangement has proved to be satisfactory, it has left something to be desired in terms of reliability and maintenance, due to the fact that with the presence of this moving part in the path of flow of the product, a tendency for product to jam between the spade and the sides of the supply hopper has been experienced. Furthermore, the positioning of the pivotal spade between the supply hopper and the primary conveyor requires additional space which adds to the height of the machine.

In addition, in the system the reduction of the bulk flow to the intermediate stage of substantially single-layer flow has heretofore been carried out exclusively under control of the spade that regulates the vibratory action of the supply hopper. From this point in the prior system, the vibratory feeders merely accelerate the flow of product to form a single-file line; i.e. the feeders perform no regulatory function so that the accuracy of product flow is dependent solely upon the action of the spade and its control of the supply hopper. It can thus be seen that if an irregularity, such as a lump or gap, should occur in the product at the spade, such irregularity is carried through to the critical point of inflight flow from the secondary feeder to the weighing hopper thereby resulting in weight inaccuracies and other machine inefficiencies, as pointed out above. Due to this, flow of product through the system has to be limited by that amount which the spade alone can accurately gauge.

Further, in the third conveyor of the combination, it has previously been the practice to obtain single-file flow by restricting the cross section of the bottom of the feeder pan. A shortcoming which has been noted by experience in this type of arrangement, and one which is particularly prevalent when packaging certain irregular products, such as potato chips, is that the restriction slows down some of the chips more than others thus causing deleterious bunching of the product. Also, the width of the feeder pan is usually made to just accommodate the medium size chips in the attempt to restrict the flow to a single line. However, in such a case, the larger chips tend to span across the sides of the pan causing further bunching of the product due to smaller chips still in contact with the bottom of the pan being fed underneath the larger chips with consequent nonuniform flow of product in flight from the conveyor.

Accordingly, it is one object of the present invention to overcome the above mentioned shortcomings and to thereby provide an improved product feeding system of vibratory conveyors wherein the product is more efficiently transformed from bulk flow to uniform flow.

It is another object of the present invention to provide a product feeding system wherein the regulatory process of the product flow is more evenly distributed throughout the system.

A related object of the present invention is to provide a system having feeder conveyors that perform regulatory functions on the product in addition to speeding up or thinning out the flow of said product.

It is still another object of the present invention to provide a feeding system for loose product wherein there are no moving parts in the path of the product flow thereby improving reliability and decreasing maintenance requirements of the system.

For attainment of the above and other objects of the invention there is provided a system of inline vibratory conveyors which, due to their interrelationship and improved construction, operate to thin out and regulate flow of product in a series of incremental steps throughout the system to obtain uniform and limited product flow at the discharge end whereby product in flight from the system is equal at any given time. Advantageously, this is done with elimination of the spade device previously required between the supply hopper and the primary feeder; reliance instead being placed on the weight of product in the primary feeder to control the feed of product from said hopper. Further, means is provided in the primary feeder to restrict the flow of product therealong so as to provide sufficient product to be capable of being weighed and to form a wedge-shaped body of product with a constant thin layer flow of product in multirow orientation being discharged from the output end of said primary feeder. The secondary feeder then transforms the multirow flow of product into a single file or column and advantageously prevents gaps or lumps at this critical point in the flow by eliminating any restriction in said secondary feeder.

The salient features of the subcombination primary feeder include the provision of a feeder pan having a horizontal section at the input end and an inclined section at the output end; the inclination of the second or inclined section being sufficient to restrict the flow of product through the pan and form a self controlling wedge of product. Further, the inclined section is positioned so as to have its center of gravity substantially correspond with the pivot point of the scale of the primary feeder so that said scale thus weighs only that product in the horizontal section. Of importance is a step provided in the bottom of the feeder pan at the juncture between the horizontal and inclined sections. This step provides a vertical face directed toward the output end of the feeder pan to engage the bottom layer of product and cause it to be positively fed up the incline. The upper layers of product in the wedge-shaped body are in addition urged forwardly by the pressure of the product positioned in the horizontal section. This dual force action creates an intermixing between the layers of the product within the body thereby insuring that a constant depth across the feeder pan is maintained. The inclination of the inclined section is approximately 10° with the bottom of the feeder pan being highly polished, which additional structural features have been found to be particularly adapted for efficient formation of the desired wedge-shaped body when the product being operated on is relatively light weight and irregularly shaped, such as potato chips.

An additional subcombination of the feeding system comprises the secondary feeder which is capable of converting a multirow supply of product into a constant single column flow which is desired in batch weighing. The important feature of this subcombination is the mounting of the feeder pan on the vibrator means at an acute angle to the longitudinal axis so as to be directed toward a guide wall extending parallel to said axis. Upon vibration, the multirow supply received from the primary feeder is urged forwardly at said acute angle and thus against the guide wall to form the single line or column. As the chips converge to one side of the pan against the guide wall, the single file line forms without lumps or gaps due to the natural tendency of the chips to readily shift position both forwardly and rearwardly since there is no restricting structure in this feeder pan. Preferably, the guide wall extends at an obtuse angle to the bottom of the feeder pan and the path of the single-file line extends along this bight portion of the pan. With this arrangement, the chips are given still further freedom of movement by slightly climbing up the guide wall so as to be capable of more easily shifting forwardly or rearwardly as required as the multirow supply converges into the single-file row.

The angle of 30° for mounting of the pan with respect to the vibrator unit has been found to be particularly good for rapid transposition of the product into a single-file row and yet obtain the fast forward feed desired. The provision of a wall extending along the opposite side of the pan at least at the input end establishes a vertical face that encourages the product most remote from the guide wall to be rapidly shifted across the bottom of the feeder pan and into line.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIG. 1 is a perspective view of a feeding system constructed in accordance with the principles of the present invention;

FIG. 2 is a side view of the feeding system shown in FIG. 1;

FIG. 3 is a view taken along line 3–3 of FIG. 2 and showing a top view of the primary and secondary vibratory feeders of the system;

FIG. 4 is a cross-sectional view taken along line 4–4 of FIG. 3 and including the supply hopper; and FIG. 5 is a schematic diagram of a simplified electrical control system for operation of the feeding system of the present invention.

With reference now to the drawings for a more specific description of the apparatus of the present invention and its operation, there is shown a feeding system 10 in FIGS. 1 and 2 which comprises a vibratory supply conveyor or hopper 11, a primary vibratory feeder 12 and a secondary vibratory feeder 13. The vibratory motion is induced in the hopper conveyor 11 by a pair of vibrators 14, 15 mounted on the underneath side of the conveyor 11, as shown in FIG. 2; whereas the feeders 12, 13 include specially constructed feeder pans 16, 17 mounted on conventional vibratory feeder units 18, 19, which may be of the Syntron type. As suggested above and as will be seen in more detail below, in certain respects the embodiment of the invention shown herein including the conveyor 11 and feeders 12, 13 is particularly adapted for feeding of potato chips in a form and fill packaging machine; however, it is to be understood that other loose products could equally well be fed by the system 10 with little or no modification of the structure shown by utilizing the principles of invention to be described.

As illustrated, the hopper conveyor 11 is orientated so as to present an output funnel 20 opening within a horizontal section 21 of the feeder pan 16. As shown, the section 21 includes an upper wall 22 contiguous thereto to assure that the free falling chips from the hopper 11 are retained in the feeder 12 to form a body B of product or chips therein (see FIG. 3). It can be seen that the space between the hopper 11 and the feeder 12 is minimized since no space is required for control parts, such as the regulatory space previously required in the system. An inclined section 23 extends forwardly from the horizontal section 21 and thus serves as the body forming restriction for the product within the primary feeder 12, as will be more fully explained later.

The exit end of the inclined section 23 is disposed above the input end of the secondary vibratory feeder 13 so as to deliver the product into the same for the final feeding operation. From the secondary feeder 13 the product free falls into a conventional scale hopper 24 carried by a weighing scale 25. To accurately control the passage of product from the secondary feeder 13 to the weighing hopper 24, a gate 26 is pivotally mounted at the lip of the feeder pan 17 and it is operated in a conventional manner by a solenoid 27. Similarly, a discharge gate 28 is provided on the weighing hopper 24 (see FIG. 2) to controllably release each batch of weighed product at the proper time. It will be understood that the actual weighing operation and the related structure just described form no part of the present invention and are shown merely to clarify the environment of said invention. For a more complete understanding of the sequence of operation of the scale 25 and gates 26, 28, reference can be made to copending application entitled "Photoelectric Weigher for Packaging Machiner," in the name of Homer S. White, Ser. No. 573,063, filed Aug. 17, 1966, and assigned to the same assignee.

Proceeding to consider one of the important features of the present invention, the amount of product entering the primary feeder 12 is controlled in accordance with the weight of the body B of product in the feeder pan 16 (see FIG. 4). This is accomplished in an advantageous manner by mounting the vibrator unit 18 on a movable scale platform 30 which is monitored for downward movement in response to the weight of the product (note FIGS. 2 and 4). Thus, a flag 31 is positioned on the underneath side of said platform 30 so as to interrupt a light beam from a light source 32 which is directed toward a photoelectric cell 33 from which the weighing signal is derived (see FIG. 1). As shown in FIG. 2, the weighing platform 30 is mounted for pivotal movement on a tower 34 by flexure plate means 35. At the opposite end of the platform 30 is a compression spring 36 which normally biases the platform 30 upwardly against the combined weight of the secondary feeder 12 and the product therein. The spring 36 may be provided with a suitable screw adjustment 37 (see FIG. 2) whereby the weight at which the photoelectric cell 33 is fired may be regulated. Suitable upper and lower stops 38, 39, respectively, are provided to limit the movement of the weighing platform 30, and dashpot 40 is included to dampen the movement of the platform 30 in a conventional manner.

The use of the weighing platform 30 to maintain the product within the feeder pan 16 equal at all times and thus to regulate the control of the supply hopper 11 is of particular advantage since it is remote from the flow path of the product and thus is not susceptible to being jammed thereby. Also, the fact that the body B of product, or more specifically chips, in the feeder pan 16 is substantial allows a weighing operation to take place, whereas in the past the amount of product in this intermediate position of similar systems has not been sufficient to allow the accurate sensing necessary. As shown in FIG. 2, the center of gravity of the inclined section 23 substantially corresponds with the pivot point of the flexure plate 35 so that only the product in the horizontal section 21 is sensed whereby the thinning out of the flow in said inclined section 16 does not affect the accuracy of the weighing operation. Furthermore, desirable stabilization of the weighing platform 30 so as not to allow the vibration of the unit 18 to interfere with the operation of the photoelectric cell 33 is accomplished through the use of the combination of the spring 36 and the flexure plate means 35 for support. Note in particular in FIG. 2 that the direction of vibration, as shown by the arrow $a$, is in substantially the horizontal plane as is the flexure plate means 35 so that no deflection of the platform 30 results due to the vibration. Thus, an accurate regulation of the weight of the body B of product in the horizontal section 21 of the feeder pan 16 at all times is assured.

Whereas the vibrator unit 18 is attached to the feeder 12 along the longitudinal axis thereof so that the chips are fed forwardly in the direction of the axis as a result of the vibratory action, vibrator unit 19 is attached to the feeder pan 17 at an angle, as can be generally noted in FIGS. 1 and 2 so that the chips tend to be fed toward the side of the pan 17 during their forward movement. Specifically, as can be seen in FIG. 3, the vibrator unit 19 is mounted at an angle $\Theta$ with respect to longitudinal axis L of the feeder 13. This means that the vibrating motion, rather than being along the longitudinal axis L, will be at an angle $\Theta$ with respect thereto as represented by the arrow $b$ in FIG. 3. As a result of this orientation, the chips received in the secondary feeder pan 17 from the primary feeder pan 16 are fed toward a sidewall 45 which thus forms a guide for lining up the chips into a single file or column C that gives the desired uniform of constant flow to the weighing hopper 24. A sidewall 46 is preferably provided on the opposite side of the pan 17 so as to not only insure confinement of the product, but also to provide a vertically extending face against which the product positioned most remotely from the guide wall 45 will be urged with extra force toward the line C.

While the angle $\Theta$ may be varied to suit the particular product, a value of 30° has been found to give particularly good results when operating on potato chips or the like in that a rapid transfer of the chips to the guide wall 45 occurs while at the same time assuring rapid forward feed toward the hopper 24. The construction of the feeder pan 17 with the guide wall 45 at an obtuse angle to the bottom of said pan 17 allows the chips extra freedom of movement during the critical point at which they are forming into a single-file row, as will be seen more clearly in detail later during description of the operation of the system.

FIG. 4 best illustrates important structural detail of the primary feeder pan 16, i.e., the depending step 50 which is formed at the juncture between the horizontal section 21 and the inclined section 23. The depending step 50 presents a vertical face directed toward the output end of the inclined section 23 so as to engage the bottom layer of product in the pan 16 thereby urging the same up the incline. When operating on potato chips or similar products, an angle of inclination of 10° has been discovered to be particularly advantageous in gaining the required restriction of flow through the pan 16 which encourages the thinning out of the product toward the output end and thereby the formation of the body B into the shape of a wedge, as will be more fully understood by noting the dash-dot outline 0 in FIG. 4. At the output end of the inclined section 23, the chips have thinned out to substantially single layer depth, as denoted by the outline 0' in this figure.

The inside surface of the feeder pan 16 is highly polished so that in combination with the slope of the inclined section 23 (FIG. 4), constant backward pressure is exerted by gravity on the chips in the horizontal section 21 by the chips in said inclined section 23. Upon vibration of the pan 16, the leading chips of the wedge 0 are thus kept restricted from freely feeding forwardly which would form gaps in the body B, and thus feeding movement is obtained only from the forward pressure of the chips in the rearward section of the wedge 0 and from the action of the step 50. These forces acting to regulate the flow and keep the body B as a solid mass with the chips firmly nested together in the form of the wedge 0, assure that if any inaccuracy occurs prior to this intermediate part of the feeding system 10, such inaccuracy is automatically corrected so that it is not carried over into the final stage of feeding in the secondary feeder 13.

In FIG. 5 there is shown a simplified schematic diagram of an electrical control arrangement 60 which can be utilized to coordinate the operation of the components of the feeding system of the present invention. In this arrangement 60, there is included an electrical power source 61 connected through the platform scale photocell 33, control circuit 62 and output lines 64, 65 to control the operation of the supply hopper vibrators 14, 15. That is, when the required weight of product of the body B in the primary feeder 12 is reached and the photocell 33 is darkened by the flag 31, the reduction in current flowing to the control circuit 62 is operative to activate said circuit 62 so as to discontinue the operation of said hopper 11 through the lines 64, 65. As the primary and secondary feeders 16, 17 continue to cycle independently of the weight of the body B in the primary feeder 12, eventually said weight is reduced sufficiently to allow the light beam from source 32 to once again shine on the photocell 33 thereby restarting the operation of the conveyor 11 through the control circuit 62.

To control the feeders 16, 17 in step with the batch weighing operation of the packaging machine, the weighing scale 25 includes a photocell 70 which when the light beam directed thereto is interrupted is operative to produce a signal to control circuit 71 and thence through output lines 72, 73 to discontinue operations of the respective vibrator units 18, 19 and to positively stop the flow of product to the weighing hopper 24 by deactivation of the solenoid 27 to cause the lip gate 26 to close (see FIG. 2). As is evident and more fully explained in the White application mentioned above, this occurs each time a batch is weighed in the hopper 24 and allows the batch to be released through the hopper gate 28 to the package being formed thereby bringing the machine in readiness for the next weighing cycle to be initiated in timed sequence.

Now proceeding to a detailed description of the preferred mode of operation of the system 10 of the invention, reference is made to FIG. 4 wherein a body B' of potato chips of multiple layers $l_1, l_2, l_3$ is shown being fed from the hopper conveyor 11 down through the funnel 20. This multilayer feed, as opposed to substantially single-layer feed previously obtained at this point, can be gained by simply increasing the power to the vibrator motors 14, 15 of the conveyor 11 until the body B' appears of a depth at the lip of the funnel 20 represented in FIG. 4. Regulation of the flow in the conveyor 11 may be obtained by adjusting the power to the vibrators 14, 15 at differential levels; however, this adjustment is not as critical as has been in the past since the following inline feeders 12, 13 regulate the flow to correct any inaccuracies that might occur from time to time at this point.

From the funnel 20, the chips enter the input end of the primary feeder pan 16. Specifically, the chips come to rest in the horizontal section 21 of the pan 16 in multiple layers, and are fed forwardly by the vibrating motion $a$ from the vibrator unit 18. As the juncture between the sections 21, 23 is reached, the step 50 engages the chips on the bottom layer of the body B which substantially increases the force urging the chips up along the incline in the direction denoted by the arrows in FIG. 4. As the chips in the body B reach the output end of the primary feeder 12, the force acting on them becomes progressively less due to the incline so that the chips thin out to substantially a single layer in a multirow configuration, as for example shown by chips $c_1, c_2, c_3, c_4$ in FIG. 3. During this feeding motion, the chips are constantly being settled or intermixed as required to maintain a constant cross section at any given point along the pan 16, or to put it another way so that any gaps or lumps in the product are eliminated.

Of particular importance is the fact that the chips in the horizontal section 21 during the feeding operation serve as a feeding force by pushing the chips in the upper layers of the body B to supplement the feeding force of step 50 acting on the lower layers as previously mentioned. The end result of these forces taken together is that the body B assumes the configuration of the wedge (note outline 0) directed up the incline of section 23 with the desired single layer discharge (note outline 0') appearing at the output end, as can clearly be seen in FIG. 4. This function of regulating the flow of the product along the length of the primary feeder pan 16 allows the multiple layers $l_1$, $l_2$, $l_3$ of chips to be fed from the hopper conveyor 11 rather than being restricted to substantially a single layer as in the past. In other words, since the flow of the chips is being regulated while being thinned out in the feeder pan 16, more efficiency is gained thereby allowing more chips to be fed through the system 10 with a consequent capability of increasing the capacity of the feeding system 10 while maintaining the desired uniform flow to the packaging machine.

As illustrated in FIG. 3, the multirow chips $c_1$, $c_2$, $c_3$, $c_4$ are pushed over the output end of the feeder pan 16 where they are received by the secondary feeder pan 17 for the final regulation and thinning out of the flow. As soon as the chips $c_1$—$c_4$ are received in the pan 17, the force b resulting from the angled mounting of said pan on the vibrator unit 19 causes said chips to shift toward the guide wall 45, as denoted by the flow arrows in FIG. 3; the provision of the wall 46 encouraging the rapid shifting of the most remote chips, such as in rows $c_1$, $c_2$ by providing a vertical reaction face, as pointed out above. About half way down the length of the feeder pan 17 all of the chips have entered the single file or column C along the guide wall 45, and as shown this line will be substantially homogeneous. This is possible since as the chips in the positions $c_1$—$c_3$ move to enter the single-file line, they are capable of urging the other chips either forwardly or backwardly as required to nest into the single row stream quickly. Further, since the line C occurs in a bight portion of the pan 17 formed by the obtuse angle between the bottom and the side 45 (see FIGS. 1 and 3) the chips are capable of climbing slightly up the wall 45 making the shifting process easier. This ease of movement in multiple directions as the line is formed allows the chips to literally skim along the pan 17 without any chance of jamming of the chips or any other action that would result in unwanted crushing of the chips.

Of greatest advantage is that with no positive restriction being applied in the secondary feeder pan 17, such as by baffles or a narrowed cross section as has been previously done, the chips may be fed at a maximum speed for greatest efficiency in the filling of the weighing hopper 24. With the chips in a single-file column in the second half of the feeder pan 17 as shown in FIG. 4, it follows that the number of chips in flight at the moment that the lip gate 26 is closed to terminate the flow is equal each time so that each successive batch weighs substantially the same, as desired. The increased capability of the secondary feeder 13 thus complements the improved capabilities of the remainder of the system 10 of the present invention whereby a substantial overall efficiency in said system 10 is realized.

In this disclosure, there is shown and described only the preferred embodiment of the invention, but, as aforementioned, it is to be understood that the invention is capable of various changes or modifications within the scope of the invention concept as expressed by the accompanying claims.

We claim:

1. A feeding system for establishing uniform product flow comprising a supply hopper for storage and feeding of product, a primary vibratory feeder for receipt of said product from said hopper, weighing means to control the flow of product to said primary feeder in response to the weight of said product therein, means to restrict the flow of said product to form a wedge-shaped body of product along said primary feeder to assure thin layer flow of product therefrom, said wedge-shaped body including multilayer product to provide substantial weight independent of the product in said hopper, a secondary vibratory feeder for receipt of said thin layer flow of product from said primary feeder in multirow orientation, and means to cause said product to be fed from said multirow orientation tending toward the formation of a single-row stream in said secondary feeder, whereby regulation of said product is evenly distributed throughout the system and equal product in flight from the system at any given time is assured.

2. The combination of claim 1 wherein said control means comprises a platform for mounting said primary feeder, means for supporting said platform for stabilized pivotal weighing movement, spring means for normally biasing said platform upwardly against the weight of said product, means for sensing the downward movement of said platform to roughly weigh the product and switch means for interrupting the operation of said hopper in response to said sensing means when a predetermined weight has been reached.

3. The combination of claim 2 wherein said supporting means includes a support tower, flexure plate means for pivotally connecting said platform to said tower, said flexure plate means extending in the direction of vibration of said primary feeder so as to prevent interference by the vibration with said weighing movement.

4. The combination of claim 2 wherein said primary feeder comprises a feeder pan that includes first and second sections and said restriction means is formed by the inclination of said second section, said inclination being sufficient to cause said thin layer of product to be a single layer and the center of gravity of said second section being positioned in substantial alignment with the pivot point of said weighing means to cause weighing of said product only in said first section to eliminate adverse effects due to thinning out of flow.